(12) United States Patent
Kowalchuk

(10) Patent No.: US 7,969,319 B2
(45) Date of Patent: Jun. 28, 2011

(54) VARIABLE HEIGHT BIN LEVEL SENSOR FOR USE WITH A PRODUCT DISPENSING AGRICULTURAL IMPLEMENT

(75) Inventor: Trevor Kowalchuk, Saskatoon (CA)

(73) Assignee: CNH Canada, Ltd. (CA)

( * ) Notice: Subject to any disclaimer, the term of this patent is extended or adjusted under 35 U.S.C. 154(b) by 315 days.

(21) Appl. No.: 12/191,548

(22) Filed: Aug. 14, 2008

(65) Prior Publication Data
US 2010/0039272 A1 Feb. 18, 2010

(51) Int. Cl.
*G08B 21/00* (2006.01)
*G01F 19/00* (2006.01)
*G01F 23/00* (2006.01)
*G07F 11/00* (2006.01)

(52) U.S. Cl. ....... 340/612; 340/617; 340/684; 73/290 R; 73/1.73; 221/6

(58) Field of Classification Search .................. None
See application file for complete search history.

(56) References Cited

U.S. PATENT DOCUMENTS

| 3,135,427 | A | | 6/1964 | Siegburg |
| 3,921,159 | A | | 11/1975 | Steffen |
| 4,100,538 | A | * | 7/1978 | Knepler ........................ 340/617 |
| 4,170,311 | A | | 10/1979 | Spaw |
| 4,774,838 | A | * | 10/1988 | Rickson et al. ................ 73/295 |
| 4,807,672 | A | * | 2/1989 | Sherk et al. ....................... 141/1 |
| 5,439,113 | A | * | 8/1995 | Elvin-Jensen ................ 206/509 |
| 5,649,600 | A | | 7/1997 | Marsh |
| 6,379,086 | B1 | | 4/2002 | Goth |
| 6,511,698 | B1 | * | 1/2003 | Kloubec ........................ 426/623 |
| 7,640,876 | B2 | * | 1/2010 | Memory ........................ 111/170 |
| 2005/0035769 | A1 | * | 2/2005 | Otto et al. ...................... 324/644 |
| 2007/0234800 | A1 | | 10/2007 | Stout et al. |

* cited by examiner

*Primary Examiner* — Julie Lieu
(74) *Attorney, Agent, or Firm* — Rebecca Henkel

(57) ABSTRACT

A fill level sensor is magnetically coupled to a hopper of an agricultural implement to provide a signal indicative of product fill level in the hopper relative to a fill line. The sensor can be positioned at various heights to provide variability in the height of the sensed fill line. The fill level sensing components are contained within a sensor housing. A magnet for magnetically mounting the sensor may be coupled to an exterior surface of the sensor housing or enclosed within the sensor housing.

20 Claims, 3 Drawing Sheets

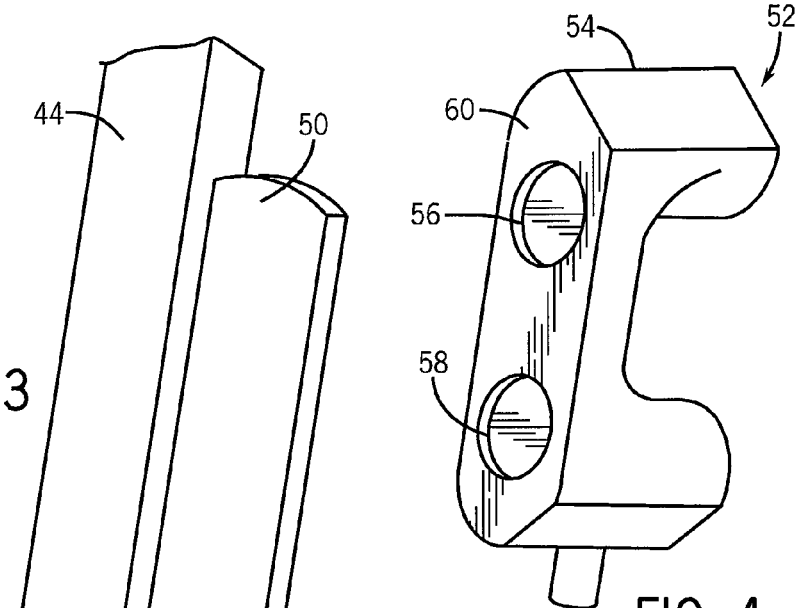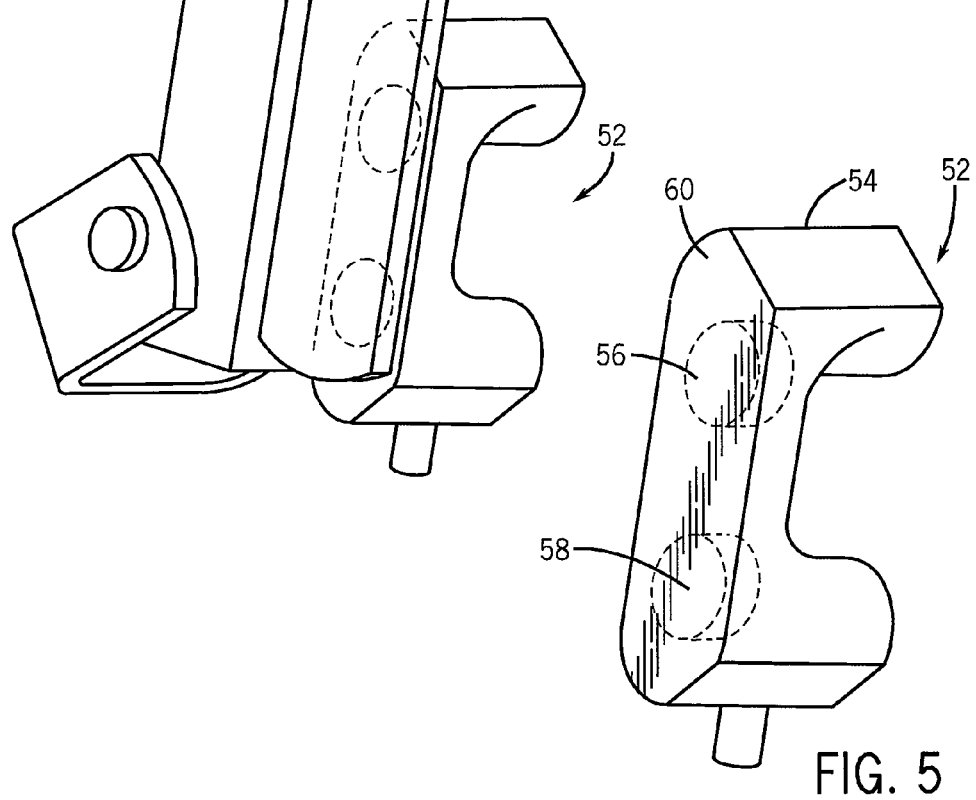

VARIABLE HEIGHT BIN LEVEL SENSOR FOR USE WITH A PRODUCT DISPENSING AGRICULTURAL IMPLEMENT

FIELD OF THE INVENTION

The present invention relates generally to agricultural implements, and in particular, to a product fill level sensor apparatus operative to detect the level of product in a product container or hopper of an agricultural implement.

BACKGROUND OF THE INVENTION

Seed and fertilizer planting farm implements typically have a seed and/or fertilizer storage container, commonly called a hopper, which is mounted to the frame of a farm implement. As the farm implement is traversed across a field, a product metering assembly dispenses product from the container along a seedbed in a metered fashion.

Generally, it is desirable to indicate to an operator when the container is reaching a point that it needs to be refilled. Typically, a sensor (or a multiple of sensors) is bracketed to a ladder or other upright member that extends down into the container. The sensor(s) is generally set up to provide a low product fill level signal when product in the container falls below a fill line that is monitored by the sensor(s). In some cases, one of the upright frame members of the ladder will be notched or include holes that allow the sensor to be positioned, i.e., clamped, at various discrete positions along the frame member to adjust the level at which a low product fill level signal is output.

While the various discrete positions offer some flexibility in setting the height of the sensor, that flexibility is albeit limited. In addition, the brackets typically used to mount the sensor require tools to loosen the bracket and then tighten the bracket at the new desired height. Further, the brackets, screws, bolts, nuts, etc. used to mount the sensor can corrode over time from extended contact with fertilizer, granular chemicals, or other corrosive products commonly stored and dispensed from the hopper.

SUMMARY OF THE INVENTION

The present invention is directed to a fill level sensor that is fastenerlessly mounted to a hopper or similar product container for use with an agricultural implement. In one representative embodiment, the sensor is magnetically coupled to an upright member, such as a ladder or mounting bar, coupled to the hopper. The fill level sensing electronics are contained within a sensor housing and in one embodiment, one or more magnets are affixed to an exterior surface of the housing. In another embodiment, the one or more magnets are contained within the housing. The sensor housing is preferably comprised of corrosion resistant material.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 3 is an isometric view of a portion of a ladder extending into the product hopper of FIG. 2 and having a bin level sensor according to one embodiment of the invention;

FIG. 4 is an isometric view of a bin level sensor having exteriorly mounted magnets according to one embodiment of the invention; and FIG. 5 is an isometric view of a bin level sensor having interiorly mounted magnets according to another embodiment of the invention.

DETAILED DESCRIPTION OF THE PREFERRED EMBODIMENTS

Figure 1:
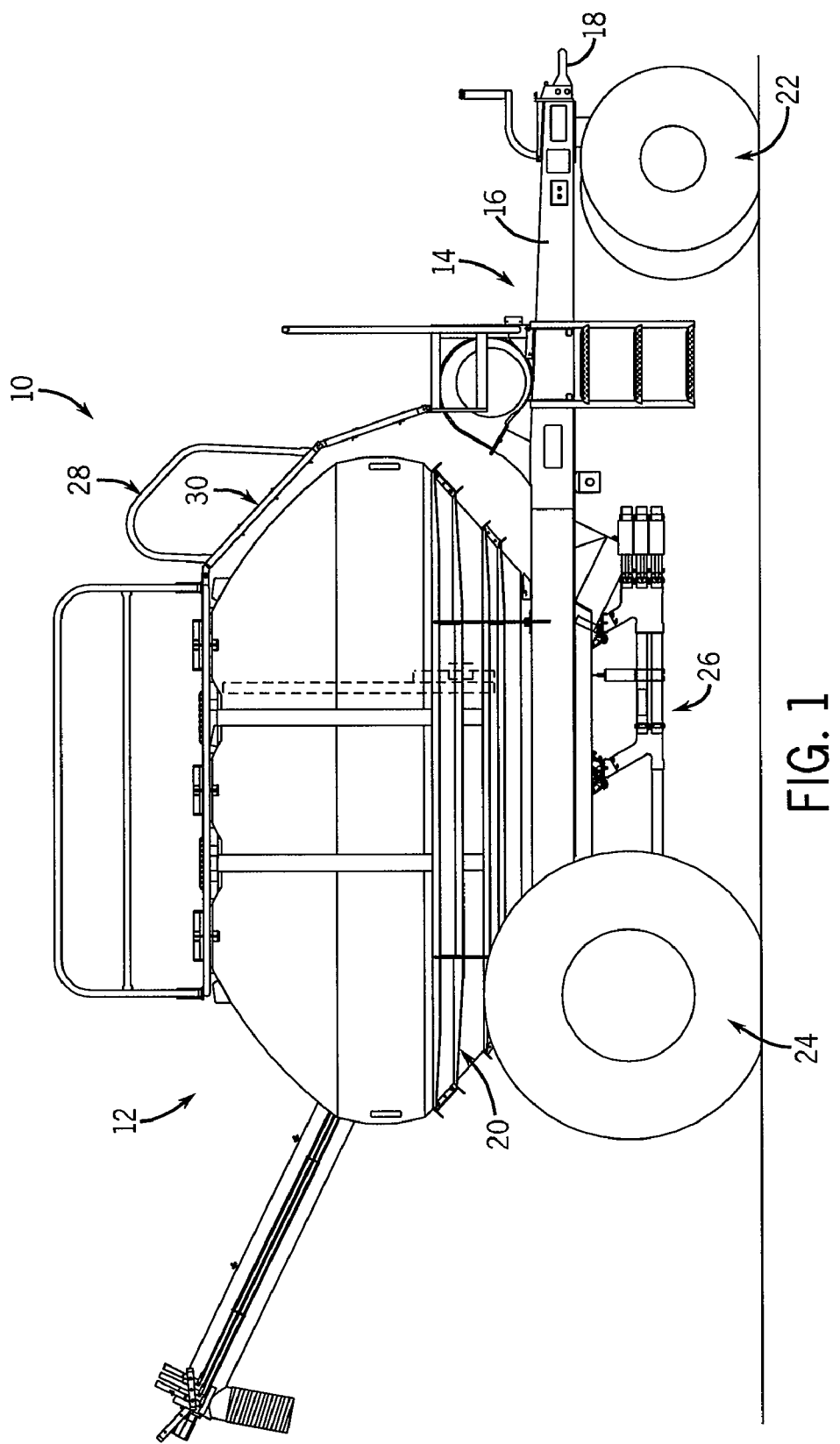
FIG. 1 is a side elevation view of a product dispensing system having a product hopper with which the present invention may be used.

Referring to FIG. 1, a product dispensing system 10 designed to dispense seed, fertilizer, or granular chemicals includes a hopper 12 supported by frame 14. The frame 14 includes a forwardly extending tow bar 16 that includes a connector 18 to mate the frame 14 with a corresponding hitch, or the like, of a towing tractor (not shown) or other towing vehicle. The hopper 12 sits in a cage 20 that is coupled to the frame 14. In one embodiment, the cage 20 is integrally formed with the frame 14. The frame 14 is supported above the ground by front wheel assembly 22 and rear wheel assembly 24. As known in the art, product is dispensed from the hopper 12 by a distribution manifold assembly 26.

Figure 2:
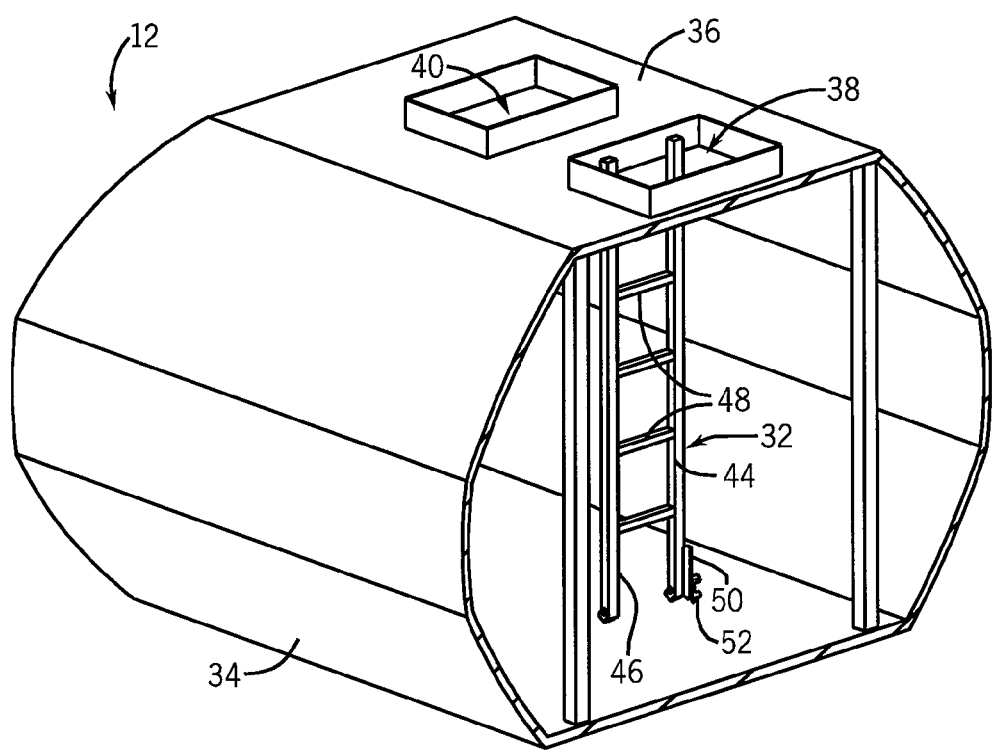
FIG. 2 is an isometric view of the product hopper of FIG. 1 with a front end panel removed to show an interior volume of the product hopper.

With additional reference to FIG. 2, the product dispensing system 10 includes a ladder assembly 28 that includes an exterior ladder 30 and an interior ladder 32 that extends downwardly into the hopper 12. More particularly, the hopper 12 includes a container 34 generally comprised of corrosion resistant material having an upper panel 36 in which two openings 38, 40 are formed. In one embodiment, the container 34 is bifurcated so that two different types of material, such as seed and fertilizer, can be separately stored in the hopper 12 and separately dispensed by the distribution manifold assembly 26 as known in the art. In this regard, the hopper 12 may include a separation panel (not shown) to divide the interior volume of the container 36 into separate sub-volumes. It is contemplated that ladders may extend downwardly into each of the sub-volumes.

Ladder member 32 includes a pair of downwardly extending frame members 44, 46 interconnected by a series of spaced transverse members 48. In accordance with one embodiment, a sensor mounting member or bar 50 is coupled to frame member 44. As further shown in FIG. 3, the sensor mounting member 50 provides a surface to which a bin level sensor 52 may be mounted. In a preferred embodiment, the bin level sensor 52 is magnetically mounted to the mounting member 50. The mounting member 50, which may extend the full length or a partial length of frame member 44, provides a range of positions at which the bin level sensor 52 may be mounted. In one embodiment, the mounting member 50 is bolted or otherwise fastened to the frame member 44. Alternately, the mounting member 50 may integrally formed with the frame member 44.

As shown in FIG. 4, the bin level sensor 52 includes a sensor housing 54 that provides an enclosure for circuit elements, such as emitters and receivers, to detect the level of product in the container 34 in a manner known in the art. In one embodiment, the level of product in the container 34 is sensed using ultrasonic components contained within the sensor housing 54 as known in the art, but it is contemplated that the fill level may be sensed in accordance with other types of sensing technologies, such as infrared technology for example.

Magnets 56, 58 are mounted in a recessed manner in a back side 60 of the sensor housing using adhesive or other type of known mounting. Although two magnets are shown, it is contemplated that a single magnet or more than two magnets could also be used. The magnets 56, 58 magnetically couple the sensor housing 54 to the mounting member 50. Since the mounting member 50 defines a range of positions at which the sensor 52 may be mounted, the magnets 56, 58 allow a user to reposition the sensor 52 at a desired position in a tool-less manner. Thus, in one aspect, the invention allows a user to variably define the level at which product in the container is sensed in a relatively easy manner.

In another embodiment shown in FIG. 5, the magnets 56, 58 are enclosed within the housing 54. In this embodiment, magnets 56, 58 have sufficient magnetic strength to permeate the housing 54 and couple the sensor magnetically to the mounting member 50. Preferably, the housing 54 is made of corrosion resistant material.

In one embodiment, the sensor 52 is magnetically mounted to a mounting member 50 that is fastened to a ladder frame member, but it is contemplated that the sensor 52 could be magnetically coupled to a metallic portion of the ladder frame member itself or, a metallic portion of the container 34 defined along an interior wall of the container.

It is further contemplated that the hopper 12 may utilize more than one fill level sensor.

Also, it is noted that the present invention is applicable with hoppers configured different than that described herein.

It is also appreciated that the output of the sensor may be communicated in a known manner to a monitor or system computer of the tractor. For example, the output may be transmitted in a wired or a wireless transmission.

Many changes and modifications could be made to the invention without departing from the spirit thereof. The scope of these changes will become apparent from the appended claims.

I claim:

1. A bin for use with an agricultural implement and configured to contain agricultural product that is to be selectively withdrawn as the agricultural implement traverses a field, the bin comprising:
   a container configured to hold agricultural related product to be dispensed onto a field; and
   a sensor magnetically connected to only an outer surface of a metal sensor mount positioned in at least a portion of the container such that no portion of the sensor extends into any portion of the sensor mount, the sensor configured to provide a signal indicative of product fill level within the container.

2. The bin of claim 1 wherein the container includes an upright member and wherein the sensor is magnetically coupled to the upright member.

3. The bin of claim 2 wherein the upright member includes a ladder extending downwardly into the container.

4. The bin of claim 1 wherein the sensor is configured to be positioned at variable heights relative to the container.

5. The bin of claim 1 wherein the sensor provides the signal when product in the container is above a sensed fill level.

6. The bin of claim 1 wherein the sensor provides the signal when product in the container is below a sensed fill level.

7. The bin of claim 1 wherein the sensor is slidably movable on the surface of the sensor mount and the sensor is detachable and re-attachable on the surface of the sensor mount for re-positioning without the use of tools or fasteners.

8. The bin of claim 1 wherein the sensor includes:
   a sensor housing containing fill level sensing electronics therein; and
   a magnet coupled to an exterior surface of the sensor housing.

9. The bin of claim 1 wherein the sensor includes a sensor housing containing fill level sensing electronics and a magnet disposed within the sensor housing.

10. A farm implement comprising:
    a product container adapted to hold product to be dispensed; and
    a sensor magnetically connected to only an outer surface of a metal sensor mount positioned in at least a portion of the product container such that no portion of the sensor extends into any portion of the sensor mount, the sensor configured to output a signal indicative of product fill level in the product container.

11. The farm implement of claim 10 wherein the sensor is slidably movable on the surface of the sensor mount and the sensor is detachable and re-attachable on the surface of the sensor mount for re-positioning without the use of tools or fasteners.

12. The farm implement of claim 10 wherein the upright member includes a ladder extending downwardly into the product container, and wherein the product container includes an upright member and wherein the sensor is magnetically coupled to the upright member.

13. The farm implement of claim 10 wherein the sensor is configured to be magnetically coupled at a variable height relative to the product container.

14. The farm implement of claim 10 wherein the product container is adapted to hold seed or fertilizer.

15. A product container for use with a farm implement designed to dispense product, the product container comprising:
    a hopper designed to be filled with an agricultural product; and
    a sensor magnetically connected to only an outer surface of a metal sensor mount positioned in at least a portion of the hopper such that no portion of the sensor extends into any portion of the sensor mount, the sensor configured to provide a fill level signal indicative of a fill level of product in the hopper.

16. The product container of claim 15 wherein the sensor is slidably movable on the surface of the sensor mount or detachable and re-attachable on the surface of the sensor mount for re-positioning without the use of tools or fasteners.

17. The product container of claim 15 wherein the hopper includes a ladder and the sensor is magnetically coupled to the ladder.

18. The product container of claim 17 wherein the sensor is repositionable at various heights along the ladder.

19. The bin level sensor of claim 15 wherein the sensor includes a sensor housing, and wherein a magnet is disposed within the sensor housing.

20. The bin level sensor of claim 15 wherein the sensor includes a sensor housing, and wherein a magnet is coupled to an exterior surface of the sensor housing.

* * * * *